United States Patent
Bartsch et al.

[15] 3,643,315
[45] Feb. 22, 1972

[54] APPARATUS FOR DRIVING ANTISKID STUDS INTO THE TREAD SURFACE OF TIRES

[72] Inventors: Friedrich Bartsch, Hannover-Herrenhausen; Heinrich Blum, Horst, both of Germany

[73] Assignee: Continental Gummi-Werke Aktiengesellschaft, Hannover, Germany

[22] Filed: Jan. 26, 1970

[21] Appl. No.: 5,674

[30] Foreign Application Priority Data

Jan. 25, 1969 Germany..................P 19 03 808.5

[52] U.S. Cl. ..................................29/211 R, 29/212 T
[51] Int. Cl.........................................B23q 7/10
[58] Field of Search...............29/212 T, 212 R, 211 R, 211 D

[56] References Cited

UNITED STATES PATENTS

| 3,199,182 | 8/1965 | Harris et al. | 29/211 D X |
| 3,487,527 | 1/1970 | Melin | 29/212 T X |

*Primary Examiner*—Thomas H. Eager
*Attorney*—Walter Becker

[57] ABSTRACT

An apparatus for driving antiskid studs into the tread surface of tires, especially pneumatic tires, by means of driving tools, which includes holding means for grasping and holding the tire to be studded and which also includes annular supporting means operable to be placed onto and around the tread surface of the tire to be studded, and equipped with a plurality of driving tools distributed over the circumference of said annular supporting means and operable selectively simultaneously to drive a plurality of studs into the tread surface of the tire to be studded.

15 Claims, 10 Drawing Figures

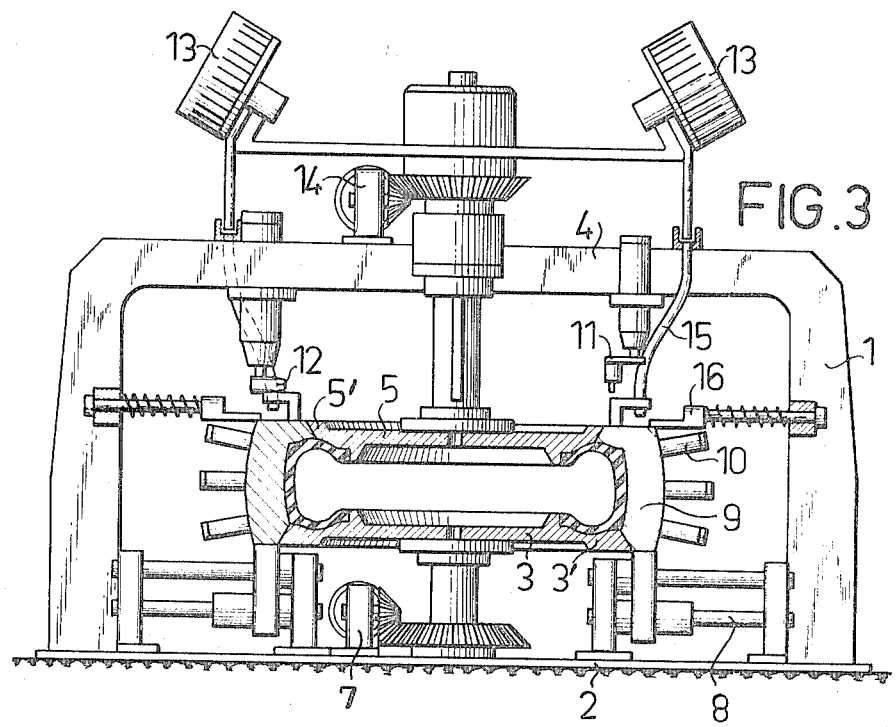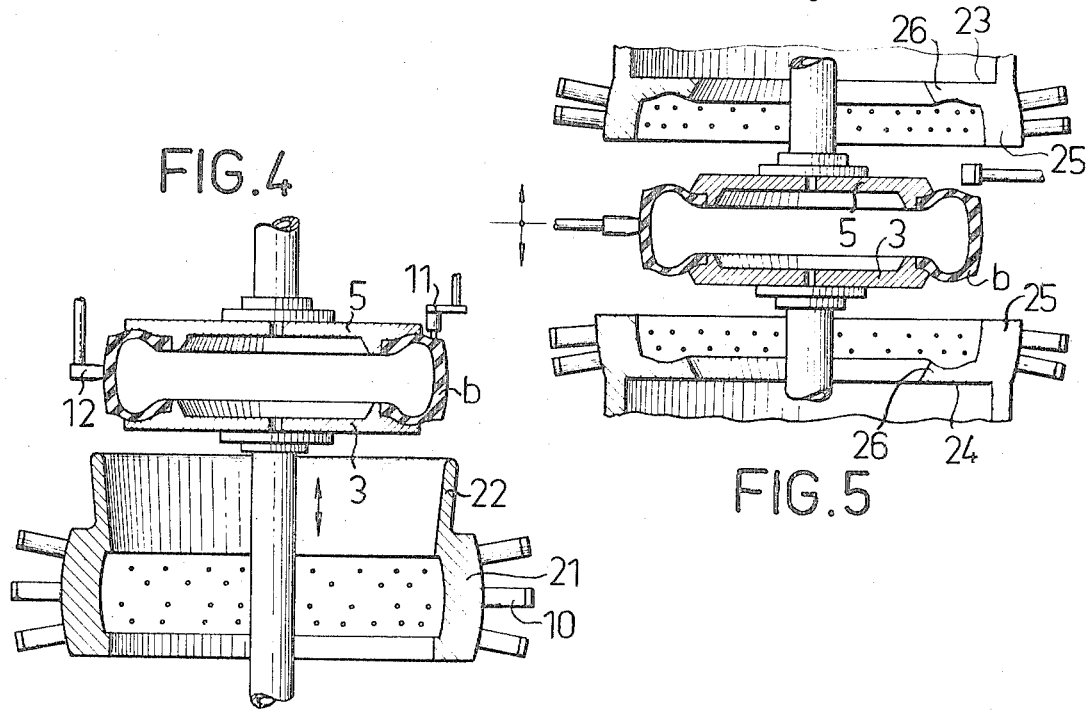

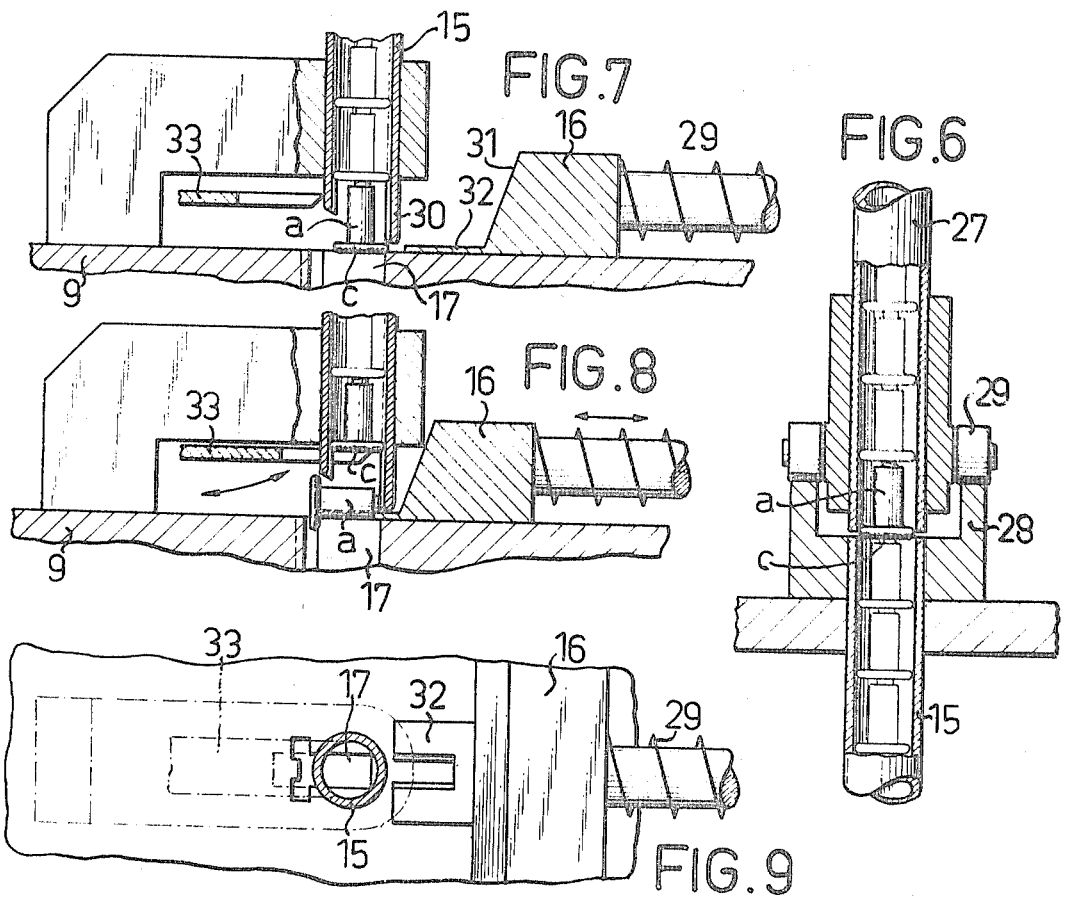
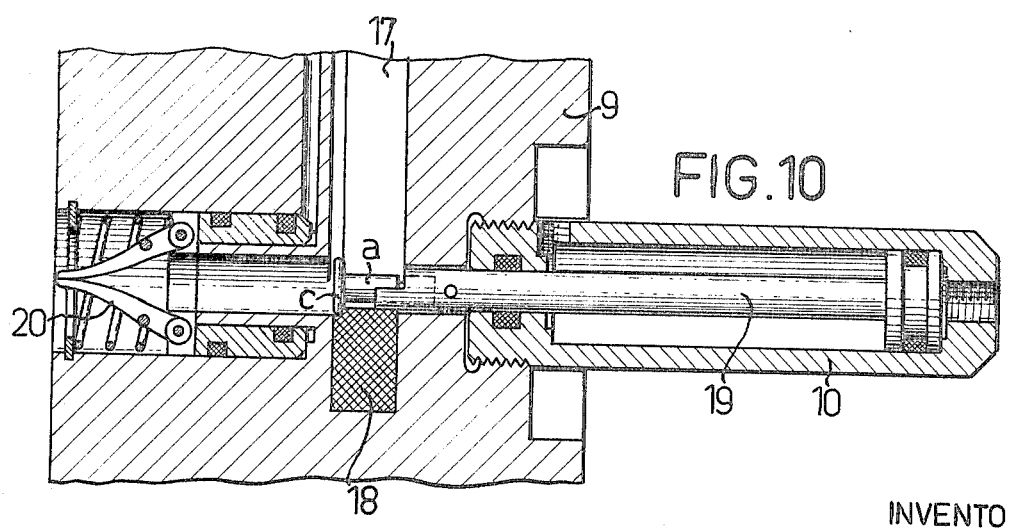

APPARATUS FOR DRIVING ANTISKID STUDS INTO THE TREAD SURFACE OF TIRES

The present invention relates to an apparatus for driving antiskid bodies into the tread surface of tires, especially pneumatic tires of rubber and similar material, and, more specifically, concerns an apparatus for driving into such tires antiskid studs with stems for guiding and/or holding the antiskid studs in the tire and adapted to be pushed into the tire in a direction substantially vertical to the tread surface of the tire, said apparatus also comprising annular or dish-shaped holding means with variable spacing therebetween for grasping the beads of the tire.

With heretofore known devices of the type involved, the tire to be studded is held by the holding means during the driving-in of the antiskid studs. The driving of the antiskid studs into the tread surface of the tire is in this instance effected by driving heads which are adapted to be lifted and lowered and which receive the antiskid studs one after another from a magazine. These driving heads are equipped with a pushrod adapted to be driven in a direction perpendicular to the tread surface of the tire in such a way that the preferably mushroomlike designed antiskid body will under the effect of the pushrod and while elastically deforming the rubber of the tire be driven into the tread strip of the tire.

It is also known rotatably to arrange the holding means for holding the tire and furthermore to mount the above-mentioned driving head to permit the latter to move transversely in such a way that the antiskid bodies can be driven at any desired area of the tread strip into the blind holes provided in most instances in the tire for receiving the studs.

With these heretofore known devices, only one driving tool is available so that consequently it is possible to drive the antiskid studs which are required in great numbers only individually into the tread surface.

It is, therefore, an object of the present invention to improve the above-mentioned apparatus in such a way that at least a considerable number of the antiskid bodies to be driven into the tread surface of the tire can be driven-in in one working operation.

This object and other objects and advantages of the invention will appear more clearly from the following specification in connection with the accompanying drawings, in which:

FIGS. 1—3 respectively illustrate vertical partial sections through an apparatus according to the invention for driving antiskid bodies into the tread surface of pneumatic vehicle tires and, more specifically, show three different phases of the working operations of such apparatus.

FIG. 4 is a vertical section through a modified apparatus according to the invention.

FIG. 5 is a vertical section through still a further modified apparatus according to the invention.

FIG. 6 illustrates on a larger scale than that of FIG. 1 in section that portion of FIG. 1 which is encircled by the circle A.

Figure 1:
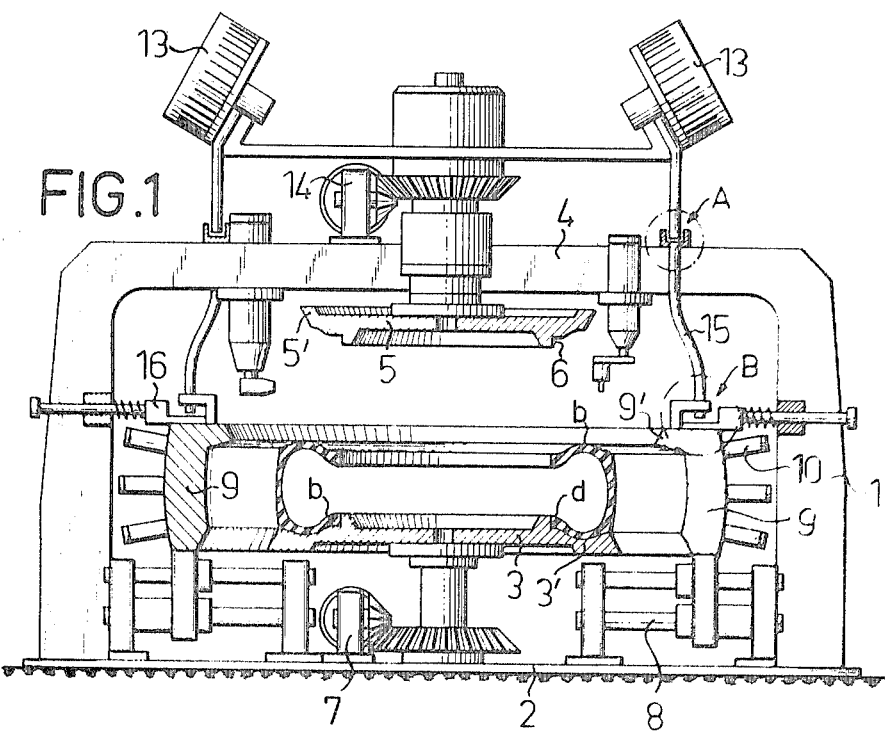

FIG. & ILLUSTRATES ON A LARGER scale THAN THAT OF FIG. 1 in section that portion of FIG. - WHICH IS ENCIRCLED BY THE CIRCLE B.

FIG. 8 shows the detail of FIG. 7 in a different working position of the apparatus.

FIG. 9 is a top view of the portion of FIG. 1 encircled by the circle B.

FIG. 10 shows a driving apparatus for a mushroom-shaped antiskid body for the apparatus according to FIGS. 1–4, but on a larger scale than that of FIGS. 1–4.

The apparatus according to the present invention is characterized primarily in that a plurality of driving tools is arranged on a ring and is substantially evenly distributed over the circumference of the ring, while the inner surface of the ring is adapted to engage the tread surface of the tire. Expediently, the free inner diameter of the ring is adapted to the outer diameter of the tire to be studded. However, it is also possible so to select the inner diameter of the ring that the inner diameter is slightly less than the outer diameter of the inflated tire so that, when the tire inner pressure is reduced, the tire can be introduced into the ring or the ring can be placed upon the tire. In this way, the tire and the ring can be firmly pressed against each other by increasing the inflation of the tire. Such mutual engagement under pressure between the tire and the ring may also be obtained by dividing the ring. The ring may preferably consist of radially movable segments, but, if desired, also two or more annular sections may be employed which can be composed to a ring having a width which corresponds to the width of the tread strip of the respective tire.

Inasmuch as the rings are adapted to the outer diameter of the tire to be studded, the driving tools or pushrods are arranged at those areas of the ring where the antiskid bodies or studs are desired on the tread surface. In this connection it is, of course, to be understood that if the tire is already provided with blind holes for receiving the studs, these holes must be aligned with the pushrods or driving tools when the tire is located within the ring which surrounds the tire in a kind of bandagelike manner.

The inner surface of the ring which engages the tread surface of the tire may also be profiled at one or more areas in order to assure proper frictional engagement between the ring and the tire. It is also possible to provide the ring at one or more areas or over its entire circumference with a profile which corresponds to the profile of the tire in such a way that protrusions provided on the inner surface of the ring will engage depressions in the tread strip of the tire. In this way a positive connection will be established between the ring and the tire. With such positive connection it will also be assured that the tire will occupy its proper position within the ring.

After the tire has been introduced into the ring or has been surrounded by the ring, the driving tools or pushrods are actuated together. Thus, the tire will over its entire circumference and over a width which corresponds to the width of the ring be provided with antiskid bodies. If the ring has a width which corresponds to the width of the tread surface, it is possible in one single working step to drive-in all antiskid bodies required for a tire.

In order to avoid any undesired deformation of the tire body while the tire is located within the ring and is being studded, in other words in order to maintain the shape of the tire in spite of the pressure exerted by the driving tools, it is advantageous to enlarge the above mentioned annular or dish-shaped holding means for holding the tire in the apparatus over their outer circumference in such a way that the enlarged or widened holding means form a counter bearing for the tire sidewalls or engage and support the tire sidewalls. However, it is also possible to provide the rings with flangelike inwardly directed extensions in order in this way likewise to form engaging surfaces for the usually easily deformable sidewalls of the tire. It is also possible, in addition to said holding means and said ring, to employ separate counter bearings which will prevent a bulging of the tire sidewalls and, while serving as counter bearing, will engage the outer surface of the tire sidewalls.

Referring now to the drawings in detail, the drawings show a pneumatic vehicle tire *b* which consists substantially of rubber or similar material and which is to be studded with antiskid bodies *a* (FIGS. 6 to 8). The tire *b* is provided with a plurality of blind holes (not shown) which are substantially evenly distributed over the circumference of the tire or the tread surface thereof and into which the antiskid bodies *a* are to be driven in such a way that the wider part *c* of the antiskid bodies or studs *a* face toward the hollow chamber defined by the tire.

The apparatus for driving the studs comprises a frame 1 the bottom plate 2 of which carries a dish-shaped circular plate 3 while the transverse beam 4 of said frame 1 carries additional plate 5. The plates 3 and 5 are coaxially arranged with regard to each other and have an annular seating surface 6 for the beads *d* of the tire *b*. The lower plate 3 is adapted to be rotated by means of a motor 7 whereas the upper plate 5 is adapted, for instance, by hydraulic means to be lifted and lowered.

The apparatus furthermore comprises guiding means 8 which extend in radial direction with regard to the plates 3 and 5 and in which there are displaceably mounted segments 9 which consist of solid material and which have associated therewith a plurality of driving tools 10.

For purposes of studding the tire b, the tire is first placed upon the lower plate 3 in conformity with FIG. 1. In this position, the upper plate 5 occupies its upper end position, whereas the segments 9 are arranged in spaced relationship to the plate 3.

Figure 2:
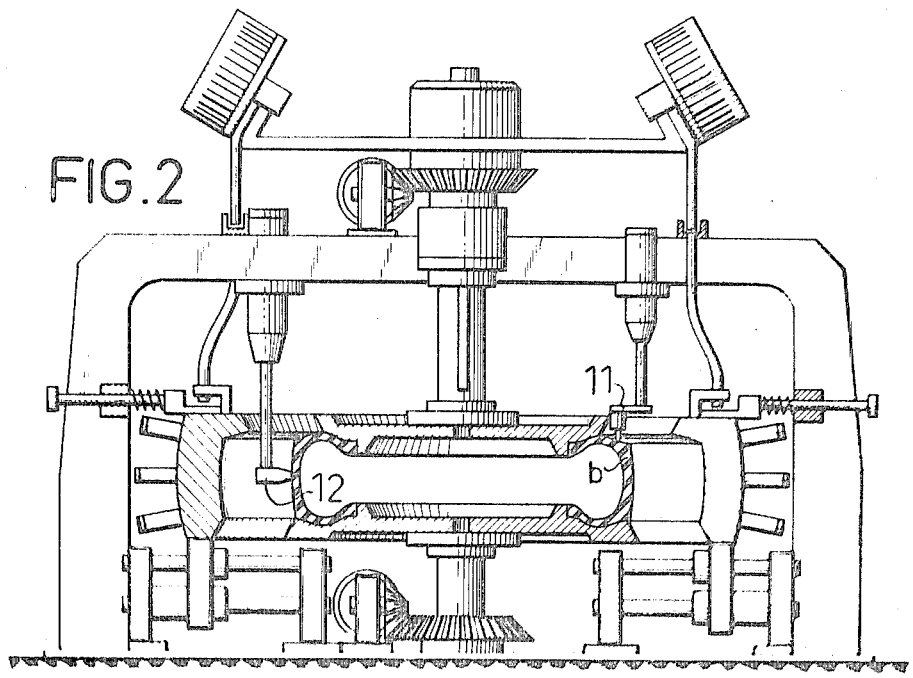

By lowering the upper plate 5, the pneumatic tire b is grasped from the top so that it is now held between the two plates 3 and 5 (see FIG. 2). The tire b is now inflated, and the two feelers 11 and 12 will see to it that the tire b will, by means of the driving motor 7, be so turned that the blind holes in the tire tread strip will be in alignment with the pertaining driving tools 10 for receiving the antiskid bodies or studs a. To this end, the sidewall of the tire is provided with a marking which responds to the feeler 11. Thereupon the segments 9 are moved in the direction toward the two plates 3 and 5 so that the tire b is now fully embraced by the parts 3, 5 and 9 consisting of rigid material. The segments 9 form a closed ring which extends over the width of the zenith portion of the tire. The upper marginal portion 9' of the segments 9 and the outer rim portion 5' of the plate 5 are widened to such an extent that the segments 9 and the plate 5 abut upon each other approximately at half the height of the respective adjacent tire side wall. The lower plate 3 has a flange-shaped widened section 3' which extends up to the tire shoulder facing the plate 3.

After the apparatus has reached the position shown in FIG. 3, the air pressure within the hollow chamber of the tire is increased. Thereupon, zone-wise or over the entire circumference of the tire, the studs a are driven into the tread surface of the tire b.

After the segments 9 and the upper plate 5 have been returned to the position shown in FIG. 1, the tire b may be removed.

The charging of the driving tools 10 is effected from magazines 13 which can be rotated by means of a motor 14 in order to be able selectively to charge the hoses 15 which are arranged in substantially even distribution over the circumference of the apparatus for feeding the studs a. Through the intervention of the slides 16 which, in the position of the segments 9 according to FIG. 1, automatically assume their effective position, the studs a, which are first coaxially located with regard to the hoses 15, are turned by 90° in such a way that they can be guided through passages 17 into the segments 9 and in this way to the driving tools 10 so that their longitudinal axes will point in the direction toward the tire b. At the end of the passage 17 there are provided holding magnets 18. The studs a are grasped by the pushrods 19 which are actuated by means of compressed air or hydraulically and can be moved in the direction toward the pneumatic tire b. By an axial movement of the pushrods 19 of the driving tools 10, the antiskid studs a will be lowered. During this movement, the spreading fingers 20 (FIG. 10) will enter the above mentioned blind holes of the pneumatic tire b so that under the influence of the pushrod 19 the driving movement of the antiskid studs a into the tread strip can be effected.

According to the embodiment of FIG. 4, the segments 9 have been replaced by a closed ring 21 which has its upper marginal portion provided with a funnellike widened extension 22. The pneumatic tire b which with this embodiment is located between the two plates 3 and 5 is by lowering the two plates 3 and 5 introduced into the ring 21 which latter is equipped with the driving tools 10. After the tire b has been introduced into the ring 21, the tire is inflated to an increased extent. It is, of course, also possible to move the ring 21 so as to be able to lift and lower the same.

The apparatus according to FIG. 5 comprises two annular molds 23, 24 which have approximately the same cross section and thus have their outer circumference provided with annular sections 25. When the two molds 23 and 24 have been moved against each other, the said annular sections 25 form a ring which extends over the width of the tire b in conformity with FIGS. 1-4. Simultaneously, in view of the approximately L-shaped cross section of the two molds 23, 24, form sections 26 are obtained which serve as counter bearing for the tire sidewalls of the pneumatic tire b when the tire is, in conformity with FIG. 3, surrounded on all sides by the two molds 23 and 24. Also in this instance, there are provided plates 3 and 5 adapted to be lifted and lowered which plates have merely seating surfaces 6, in other words, no widened portions in the meaning of the widened portions 3' and 4' respectively. Preferably, the lower mold 24 is stationarily mounted whereas the mold 23 can be lifted and lowered. When the two plates 3 and 5 have grasped the tire b and are spaced from each other in conformity with the required mouth width of the pneumatic tire b or the required width between the beads, the two plates 3 and 5 are in the position according to FIG. 5 together with the tire b grasped thereby and lowered to the lower mold 24. Subsequently, the mold 23 is lowered whereupon, preferably after the inner pressure of the tire has been increased, the driving of the studs a is effected by actuating the driving tools 10.

FIG. 6 shows the transfer of the studs a from the rotatably mounted magazine 13 to the hoses 15 of which a plurality is provided, with the hoses substantially evenly distributed over the circumference of the apparatus. Fixedly connected to the magazines 13 are pipes 27 the lower ends of which are provided with rollers 29 guided on rails 28. The rails 28 are U-shaped. The pipes 27 extend into the profile of the annular rails 28 from where the studs a move into the hoses 15.

FIGS. 7, 8 and 9 illustrate how the studs a pass from the hoses 15 into the passages 17. This transfer is effected by tilting the studs a by 90°. The respective stud a which moves to the segment 9 in vertical position is grasped at its lower end by the fork-shaped ends of the slide 16 and tilted by 90°. The movement of the slide 16 is effected against the thrust of a pressure spring 29 which rests on the frame 1 whereas the slide itself is moved in the direction toward the frame 1 when the segments 9 are moved radially outwardly. Prior to the unilaterally downwardly extended part 30 grasping the end face 31 of the slide 16, the fork-shaped free end 32 has acted upon the lower end of the stud a while the stud a occupies the position shown in FIG. 8. Thereupon a downward movement of the stud a with horizontally extending axis may take place.

The apparatus furthermore comprises a transversely movable counter bearing 33 for preventing the studs a still located in the hose 15 or these studs from following those studs which are already on the segment 9.

After the tilting movement of the studs a into the position of FIG. 8 has been completed and the segments have been moved radially inwardly, the studs a are freed from the slides 16 so that they can enter unimpededly into the passage 17.

For reasons of a better illustration, the detail showing of FIG. 10 has been turned by 90°. In assembled condition, the passage 17 extends vertically downwardly and the pushrod 19 extends horizontally.

It is, of course, to be understood that the present invention is, by no means, limited to the particular showing in the drawings but also comprises any modifications within the scope of the appended claims.

We claim:

1. An apparatus for driving antiskid studs into the tread surface of a tire, which includes: holding means operable to grasp and hold the tire to be studded from the sides thereof, annular supporting means operable to be placed onto and around the tread surface of the tire to be studded, and a plurality of stud-driving means supported by said supporting means and distributed around the circumference thereof, said annular supporting means comprising a plurality of segments movable selectively radially inwardly and outwardly with regard to the tire to be studded.

2. An apparatus for driving antiskid studs into the tread surface of a tire, which includes: holding means operable to grasp and hold the tire to be studded from the sides thereof, annular supporting means operable to be placed onto and around the tread surface of the tire to be studded, and a plurality of stud-driving means supported by said supporting means and distributed around the circumference thereof, said annular supporting means having a tubular extension for introducing the tire to be studded into said annular supporting means.

3. An apparatus according to claim 2, in which the inner surface of said tubular extension flares in a direction away from said annular supporting means.

4. An apparatus for driving antiskid studs into the tread surface of a tire, which includes: holding means operable to grasp and hold the tire to be studded from the sides thereof, annular supporting means operable to be placed onto and around the tread surface of the tire to be studded, and a plurality of stud driving means supported by said supporting means and distributed around the circumference thereof, said holding means having portions thereof contoured in conformity with the bead portions of the tire to be studded for engaging said bead portions, said holding means also being provided with extension means for supportingly engaging the tire sidewalls during the studding of the tire to be studded.

5. An apparatus for driving antiskid studs into the tread surface of a tire, which includes: holding means operable to grasp and hold the tire to be studded from the sides thereof, annular supporting means operable to be placed onto and around the tread surface of the tire to be studded, and a plurality of stud-driving means supported by said supporting means and distributed around the circumference thereof, said annular supporting means being provided with lateral extension means for engaging and supporting the sidewalls of the tire to be studded.

6. An apparatus for driving antiskid studs into the tread surface of a tire, which includes: holding means operable to grasp and hold the tire to be studded from the sides thereof, annular supporting means operable to be placed onto and around the tread surface of the tire to be studded, and a plurality of stud-driving means supported by said supporting means and distributed around the circumference thereof, said annular supporting means comprising two complementary sections operable to be placed onto the tire to be studded from opposite sides thereof, each of said sections having laterally inwardly extending extension means for engaging and supporting the sidewalls of the tire to be studded.

7. An apparatus for driving antiskid studs into the tread surface of a tire, which includes: holding means operable to grasp and hold the tire to be studded from the sides thereof, annular supporting means operable to be placed onto and around the tread surface of the tire to be studded, a plurality of stud-driving means supported by said supporting means and distributed around the circumference thereof, said holding means being movable from opposite sides toward each other in the axial direction of the tire to be studded, and means associated with said holding means for axially adjusting said holding means toward each other to space the same at a distance corresponding to the mouth width of the tire to be studded.

8. An apparatus for driving antiskid studs into the tread surface of a tire, which includes: holding means operable to grasp and hold the tire to be studded from the sides thereof, annular supporting means operable to be placed onto and around the tread surface of the tire to be studded, and a plurality of stud-driving means supported by said supporting means and distributed around the circumference thereof, said annular supporting means having the inner surface thereof provided with protrusions for engagement with profiled portions of the tread strip of the tire to be studded.

9. An apparatus according to claim 8, in which said protrusions correspond to depressions of the tread strip of the tire to be studded for engagement therewith.

10. An apparatus for driving antiskid studs into the tread surface of a tire, which includes: holding means operable to grasp and hold the tire to be studded from the sides thereof, annular supporting means operable to be placed onto and around the tread surface of the tire to be studded, and a plurality of stud driving means supported by said supporting means and distributed around the circumference thereof, said stud-driving means including feeding means for feeding the studs to be driven into the tire to be studded toward said tire, and also comprising means for tilting the studs being supplied through said feeding means by approximately 90° prior to driving the studs into the tire to be studded.

11. An apparatus according to claim 10, in which said annular supporting means comprises a plurality of radially movable segments, said segments being operatively connected to said feeding means and being operable in response to a radial movement of said segments relative to the tire to be studded to tilt the studs being fed for driving into the tire to be studded.

12. An apparatus according to claim 11, in which said segments have associated therewith sliding means, returning force means continuously urging said sliding means to move in one direction, and abutment means connected to said segments and operable to engage said sliding means and move the same radially against the thrust of said returning force means.

13. An apparatus for driving antiskid studs into the tread surface of a tire, which includes: holding means operable to grasp and hold the tire to be studded from the sides thereof, annular supporting means operable to be placed onto and around the tread surface of the tire to be studded, and a plurality of stud driving means supported by said supporting means and distributed around the circumference thereof, magnetic means operable to hold the respective stud stationary prior to the driving action of said stud-driving means.

14. An apparatus according to claim 10, which includes stud-receiving magazine means movable selectively for releasing studs to one or more feeding means.

15. An apparatus for driving antiskid studs into the tread surface of a tire, which includes: holding means operable to grasp and hold the tire to be studded from the sides thereof, annular supporting means operable to be placed onto and around the tread surface of the tire to be studded, and a plurality of stud-driving means supported by said supporting means and distributed around the circumference thereof, said holding means and said annular supporting means being operable to enclose the tire to be studded on all sides at the start of the studding of the tire engaged by said holding means and said annular supporting means.

* * * * *